(No Model.) 2 Sheets—Sheet 2.
F. C. PECK.
CHECK ROW CORN PLANTER.
No. 505,251. Patented Sept. 19, 1893.
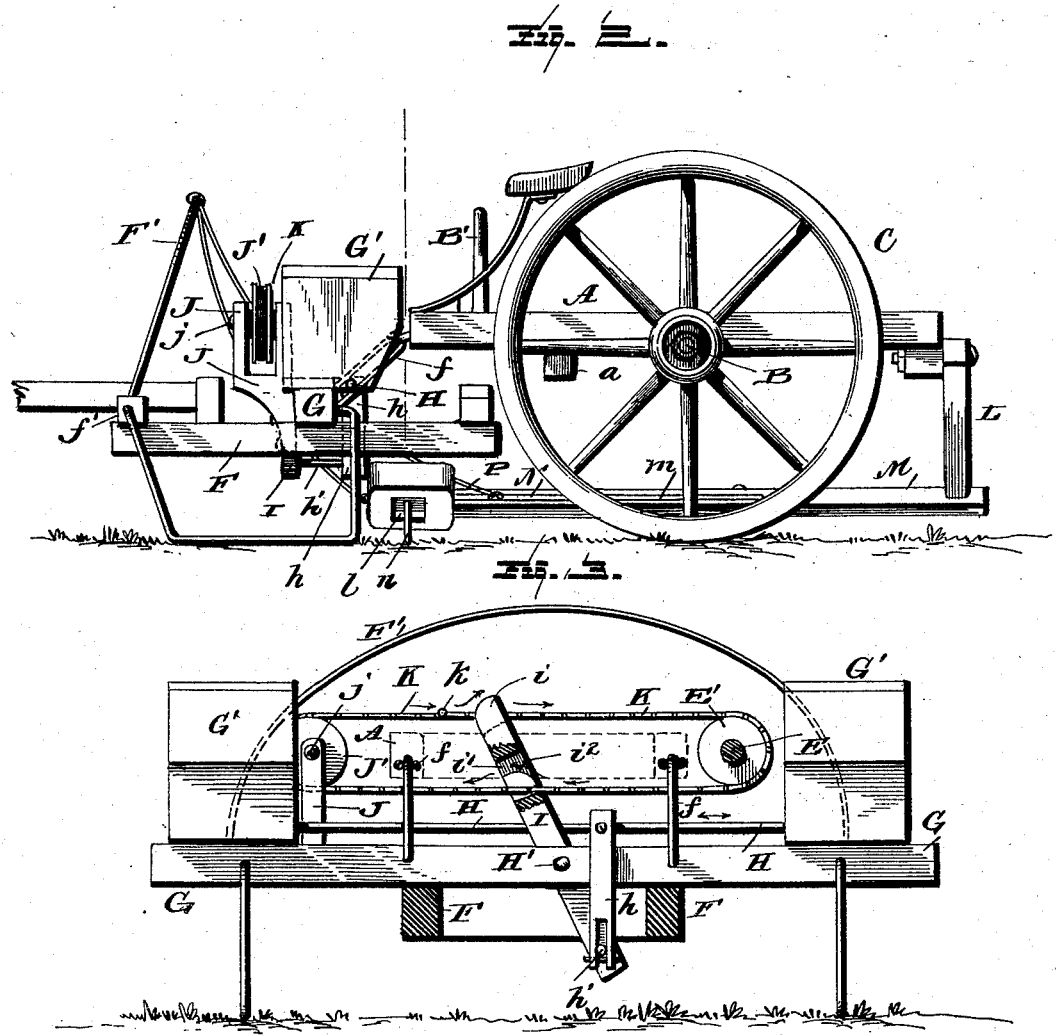
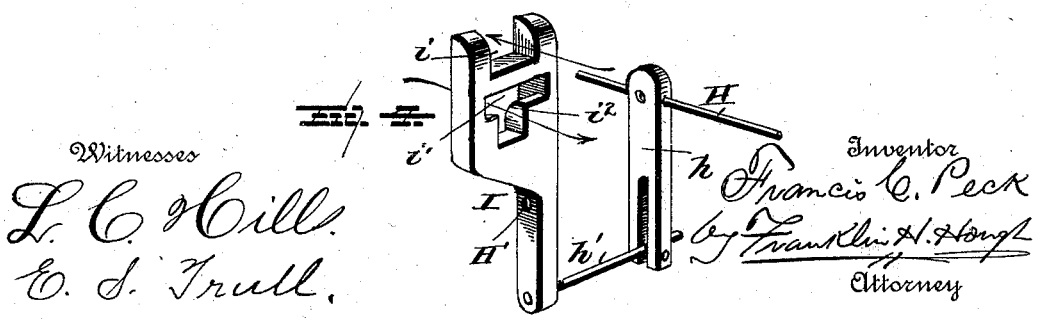
Witnesses
L. C. Hill.
E. S. Trull.
Inventor
Francis C. Peck
by Franklin H. Hough
Attorney

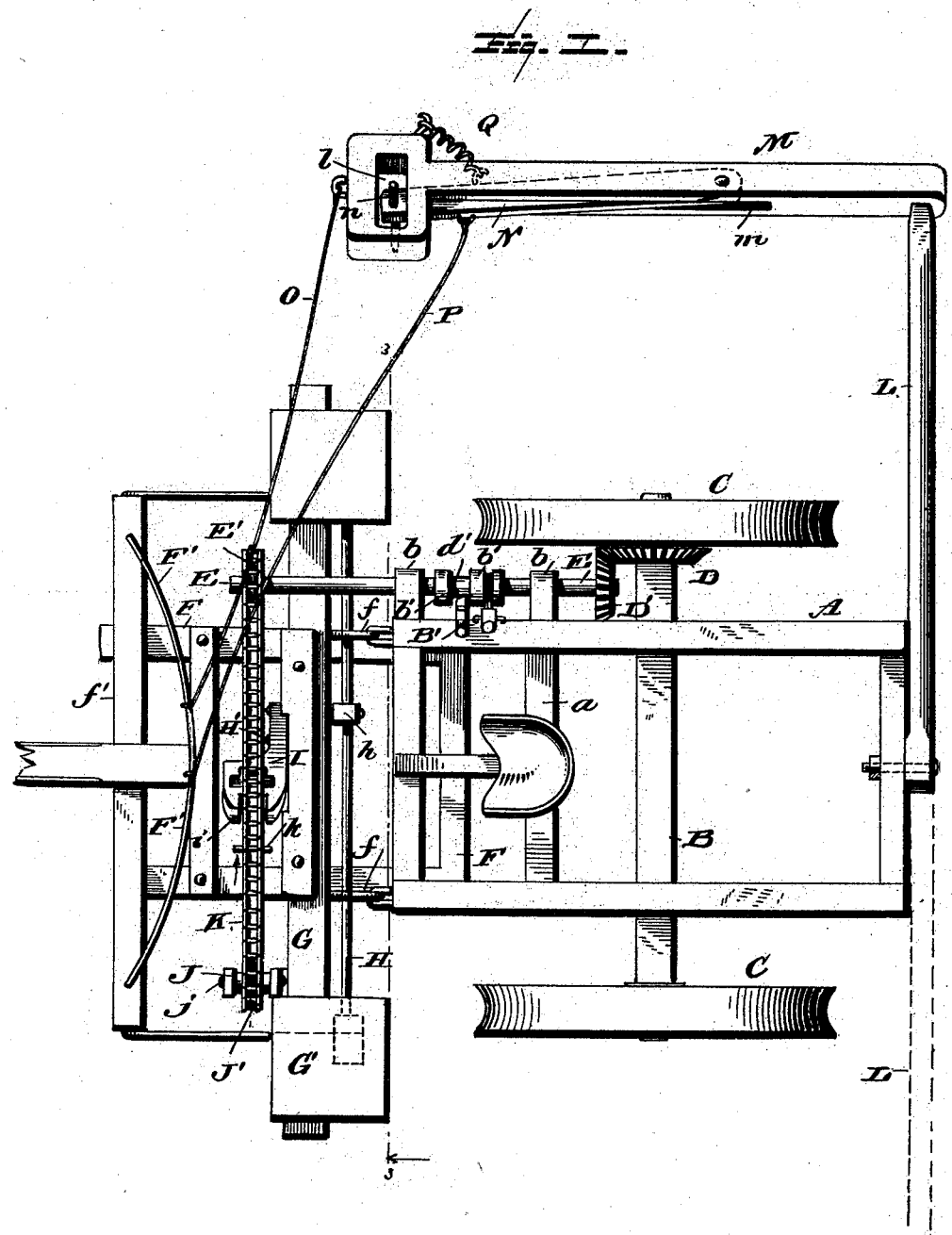

UNITED STATES PATENT OFFICE.

FRANCIS C. PECK, OF SHANNONDALE, INDIANA.

CHECK-ROW CORN-PLANTER.

SPECIFICATION forming part of Letters Patent No. 505,251, dated September 19, 1893.

Application filed May 16, 1893. Serial No. 474,432. (No model.)

*To all whom it may concern:*

Be it known that I, FRANCIS C. PECK, a citizen of the United States, residing at Shannondale, in the county of Montgomery and State of Indiana, have invented certain new and useful Improvements in Check-Row Corn-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in check row corn planters, and it has for its objects among others to improve generally upon this class of devices and to provide a simple and cheap yet durable and efficient planter by which more work can be done in a more satisfactory manner than by the forms heretofore devised.

It has for a further object to provide improved means for dropping the seed and for automatically changing the direction of movement of the dropper slide.

It has for a further object to provide an improved marker which can be operated from the driver's seat and is at all times under his control.

Other objects and advantages of the invention will hereinafter appear and the novel features thereof will be specifically defined by the appended claims.

The invention in this instance resides in the peculiar combinations, and the construction, arrangement and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 1 is a plan view of my improved planter. Fig. 2 is a side elevation thereof. Fig. 3 is a vertical cross section just to the rear of the dropper-slide, on line 3, 3, of Fig. 1. Fig. 4, is a detail.

Like letters of reference indicate like parts throughout the several views.

Referring now to the details of the drawings by letter, A designates the main frame, B the axle and C the wheels all of which may be of any well known or approved form of construction, the frame being braced by the cross timbers $a$.

On the inner face of the hub of one of the wheels is a cog wheel D which meshes with the cog wheel D' on the shaft E which extends lengthwise of the machine and is journaled in suitable bearings $b$ secured to the frame as shown. The forward end of this shaft carries a sprocket wheel E' the object of which will soon appear. This shaft is mounted in its bearings to be moved endwise so as to throw the cog wheel thereon into or out of mesh with the cog wheel on the main wheel.

B' is a lever pivoted between its ends to the main frame and having one end adapted to engage in a groove $d'$ of the collar $b'$ on the shaft so that the movement of this lever in one direction or the other will cause the cog wheels to mesh or to be thrown out of mesh.

F is a supplemental frame arranged upon a lower plane than the main frame and connected therewith by the chains or the loosely connected links $f$ so that the supplemental frame is free to play up and down. The front cross bar $f'$ of this frame is extended upon both sides and carries the arched rod or wire F' as shown. To this front cross bar the tongue or pole is designed to be attached. To the rear cross bar G of this frame the seed boxes G' are attached and the slides of said boxes are designed to work in guides in the usual manner. The rod arm or bar H which operates these slides is guided in its reciprocations by the links which connect the supplemental frame to the main frame as shown, and this rod or bar is secured to the vertical arm $h$ which is connected by the horizontal link $h'$ with the lower end of the lever I which is arranged vertically and is pivoted between its ends as at H' to the front face of the rear cross bar of the supplemental frame as shown, the connection being such that as the lever I is moved in one direction the rod or bar H is moved in the opposite direction. The upper end of the lever I is broadened as shown and in its upper face is formed a notch or groove $i$ open at the top and below this but above the pivot the lever is provided with an opening $i'$ extending therethrough as shown best in Fig. 4, the approach to which is tapered or beveled as seen at $i^2$.

J is a bracket secured to the rear cross bar of the supplemental frame at the end opposite the sprocket wheel E' as shown and in this bracket is journaled the short shaft $j$ carrying a sprocket wheel J'. K is a sprocket chain passed over these two sprocket wheels and passing through the notch in the top of the lever I and through the opening therein; the chain is provided with a transverse pin or lugs $k$ in one of the links thereof to engage the lever when it comes in contact therewith to automatically shift the lever and thus actuate the dropper slides.

L is an arm pivotally held at one end to the rear cross bar of the main frame so as to swing from a horizontal position at one side to a horizontal position upon the other side of the machine. To the outer end of this arm is fixedly secured the arm M which extends lengthwise of the machine and its outer end is provided with a longitudinal slot $m$ which communicates at its forward end with a transverse slot $l$.

N is an arm pivoted at one end in the longitudinal slot $m$ of the arm M and its outer end working in the transverse slot $l$; the outer end carries the marker $n$ which extends in both directions and works in the vertical opening $m'$ in the lateral portion of the arm M, extending upon both sides so as to operate either side up.

O is a cord or chain secured to the end of the arm M and designed to be connected with the arched rod F on the front cross bar of the supplemental frame as shown so that it may be under the control of the operator or driver.

To the inner face of the outer end of the arm N is attached one end of a cord or chain P the other end of which is extended to within convenient reach from the driver's seat so that he can actuate said arm when desired. A spring Q is connected with the opposite face of said arm and with the arm M to normally keep the arm N in its outward position.

The operation of the different parts of my improved planter will be readily understood from the foregoing description when taken in connection with the annexed drawings, and a further detailed description is not deemed necessary.

What I claim as new is—

1. The combination with the frame and the dropper mechanism, of the marker reversibly mounted on the frame and having a spring-actuated portion, and a cord connected therewith and extended toward the driver's seat as set forth.

2. The combination with the main frame and the supplemental frame, of the dropper mechanism, the means for actuating the same, and the reversible marker, having a pivoted spring-actuated portion and a cord for operating the same substantially as specified.

3. The combination with the main frame, of the arm pivoted thereon and carrying an arm with a slot, and the spring-actuated marker-arm pivoted in said slot, the arched rod, and the cord connecting the same with the marker arm substantially as and for the purpose specified.

4. The combination with the main frame, of the arm pivoted thereto, the arm connected therewith and extending at right angles thereto and having a slot and a lateral extension, and the spring-actuated arm pivoted in said slot and carrying a vertical pin and provided with a cord or chain, substantially as specified.

5. The combination with the main frame and the supplemental frame having arched rod, of a reversible marker its spring-actuated pivoted arm and a cord attached thereto and with the arched rod, as set forth.

6. The combination with the main frame and the supplemental frame, of the reversible marker on the main frame and having a spring-actuated pivoted marker arm and the dropper mechanism on the supplemental frame, as set forth.

7. The combination with the main frame and the supplemental frame, of the reversible marker on the main frame, the spring-actuated pivoted marker arm, its cord the arched rod the dropper mechanism on the supplemental frame, and the mechanism for actuating the dropper mechanism from the main wheel, as set forth.

In testimony whereof I affix my signature in presence of two witnesses.

FRANCIS C. PECK.

Witnesses:
STRAWDER W. PECK,
BENJAMIN MARTIN.